United States Patent [19]

Cleasby

[11] Patent Number: 4,862,920
[45] Date of Patent: Sep. 5, 1989

[54] SPOOL FOR A SPOOL VALVE AND METHOD OF PRODUCING SAME

[75] Inventor: Kenneth G. Cleasby, Chicester, England

[73] Assignee: Vickers Systems Limited, Havant, England

[21] Appl. No.: 221,083

[22] Filed: Jul. 19, 1988

[30] Foreign Application Priority Data

Jul. 29, 1987 [GB] United Kingdom ............... 8717963

[51] Int. Cl.[4] ........................................... F15B 13/04
[52] U.S. Cl. ............................ 137/625.3; 29/157.1 R; 137/625.69; 251/324
[58] Field of Search ............... 29/157.1 R; 137/625.3, 137/625.69; 251/324, 282

[56] References Cited

U.S. PATENT DOCUMENTS

| | | | |
|---|---|---|---|
| 2,920,650 | 1/1960 | Moog | 137/625.69 |
| 2,958,340 | 11/1960 | Rosebrook | 137/625.69 |
| 3,525,500 | 8/1970 | Bender | 137/625.69 X |
| 4,009,730 | 3/1977 | Starling | 137/625.3 X |
| 4,245,816 | 1/1981 | Johnson | 137/625.3 X |
| 4,313,467 | 2/1982 | Lang | 251/324 X |
| 4,347,780 | 9/1982 | Takahashi et al. | 91/467 X |
| 4,463,660 | 8/1984 | Mucheyer et al. | 137/625.69 X |
| 4,667,930 | 5/1987 | Latimer et al. | 137/625.3 X |

FOREIGN PATENT DOCUMENTS 57-29861  2/1982  Japan ............... 137/625.69

Primary Examiner—Gerald A. Michalsky
Attorney, Agent, or Firm—Barnes, Kisselle, Raisch, Choate, Whittemore & Hulbert

[57] ABSTRACT

The invention provides a spool for a spool valve, the spool (1) comprising at least one annular land (2) having at least one notch (3) therein which is part conical (4). The invention also provides a method of producing such a spool.

16 Claims, 5 Drawing Sheets

$$\frac{360°}{\text{NUMBER OF NOTCHES}} =$$

SPOOL FOR A SPOOL VALVE AND METHOD OF PRODUCING SAME

BACKGROUND OF THE INVENTION

1. Field of the Invention

This invention relates to spool valves and more particularly to a spool for a spool valve and a method of producing same.

2. Description of the Prior Art

The spool of a spool valve normally comprises at least one annular land which cooperates with at least one annular land on the surface of a passage in a valve body in which the spool is slidable to control flow through the valve. In order to meter the fluid flow through the valve it is known to provide notches in a side surface of said land which extend inwardly from the periphery thereof. For reasons of cost, such notches are conventionally produced using a cylindrical or parallel sided milling cutter introduced radially of the spool at two or more positions around the circumference of the spool. Such spools suffer from the disadvantage that, due to the position of the inlet and outlet ports within the valve body, the flow rate through the valve can vary with the angular position of the spool given a constant differential pressure between the inlet and outlet ports of the valve, with the sensitivity to angular position of the spool increasing with increasing flow rate. Another disadvantage is that in order to maximise the flow rate large notches must be used and that when these are produced using a cylindrical cutter a segment of spool material is left between each pair of adjacent notches which is both mechanically weak and can easily become over hardened by heat treatment. Conventionally, to overcome this, a notch diameter is selected which leaves an acceptable wall thickness between the notches at the expense of flow rate.

Advantageously, the notches should be designed so that as the spool moves from an initial position at which flow is wholly through the notches there is a gradual increase in the percentage of the circumference of the spool contained within the notches to provide a smooth transition to a spool position at which flow can occur around the full circumference of the spool. Thereafter, with increasing spool displacement, metering should remain at full circumference of the spool to reduce the susceptibility of the flow to the angular position of the spool. With the known parallel-sided notch form it is not possible to blend the notches together to give the required smooth transition without either sacrificing flow rate or producing an unacceptable shape in the remaining spool material.

SUMMARY OF THE INVENTION

The present invention provides a spool for a spool valve, the spool comprising at least one annular land having at least one part conical notch in a side surface thereof and extending inwardly from the outher periphery thereof.

The invention also provides a method of producing a spool for a spool valve comprising the steps of obtaining a spool having at least one annular land thereon and forming in a side surface of said land at least one part conical notch which extends inwardly from the outer periphery thereof.

The axis of said part conical notch may extend substantially radially of the spool, to which end the notch may be formed by a tool, e.g., a milling cutter having a frusto-conical cutting end portion, introduced substantially radially of the spool.

Preferably a plurality of said notches are formed in said land and are angularly spaced therearound.

Said plurality of notches may be of equal size and be evenly arranged around said land. Preferably, the inclusive conical angle of each of said notches is $360°/N \pm 30°$ where N equals the number of notches.

Alternatively, said notches may be of two or more different sizes and be evenly arranged around said land, with the angular distance between the axis of any two adjacent notches preferably being equal to half the sum of the inclusive conical angles of the two adjacent notches.

Whether the plurality of notches are of equal size or of two or more different sizes, the arrangement is preferably such that adjacent notches are separated by an edge which lies in a plane extending longitudinally and radially of the spool. This will not only maximise the flow rate through a spool valve comprising the spool but, because of the conical form of the notches, said edge will be buttressed and therefore mechanically strong and less susceptible to over hardening as by heat treatment.

If the or each notch is made part conical over the whole of its radial extent then diameter finishing operations, such as final grinding, could result in a change in the notch opening position along the length of the spool. To overcome this problem a portion of the or each notch at the outer periphery of said land may be part cylindrical. According to a preferred embodiment, the or each said notch comprises a first outer conical portion having a first inclusive conical angle and a radially inner blend form such as a radiussed portion or a conical portion having an inclusive conical angle larger than said first inclusive conical angle to blend the notch into the body of the spool. Thus, the or each notch may comprise a part cylindrical portion at the outer periphery of said land, a first outer conical portion and a radially inner conical or other portion as aforesaid.

It has been found that if the milling cutter or other tool used to produce the or each notch is hollow or is recessed as its cutting end so as to produce a horseshoe-like cut at the radially inner end of the notch adjacent the tool body then flow through a valve incorporating the spool appears to be improved.

The spool may have a plurality of lands thereon each comprising at least one said notch.

The invention also provides a spool valve comprising a valve body having a passage therein and a spool according to the present invention slidable in said passage. Said passage may have at least one annular land on the surface thereof which cooperates with the at least one annular land on said spool.

BRIEF DESCRIPTION OF THE DRAWINGS

The invention will be more particularly described with reference to the accompanying drawings, in which.

DESCRIPTION OF THE PREFERRED EMBODIMENT

Figure 1:
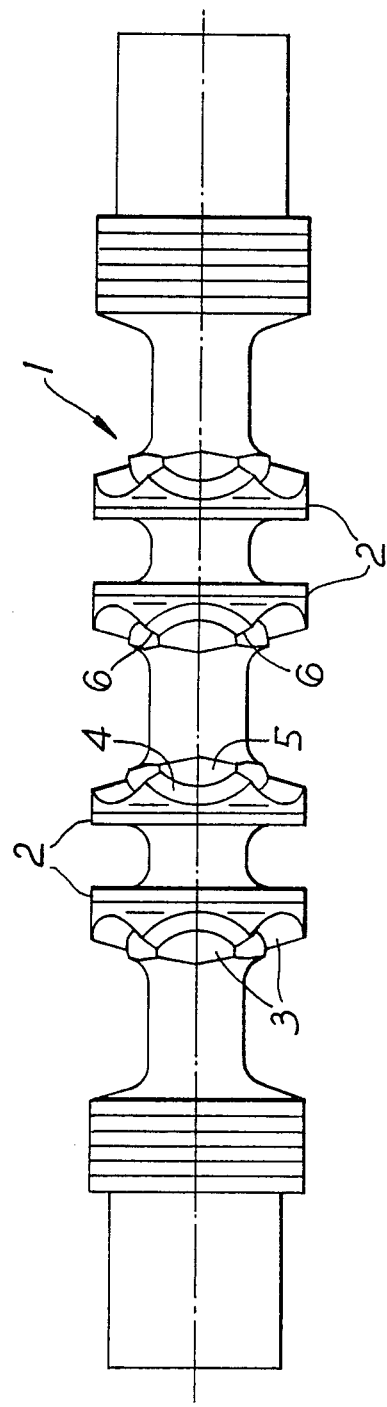
FIG. 1 is a side elevation of a spool for a spool valve according to the present invention.
Figure 4:
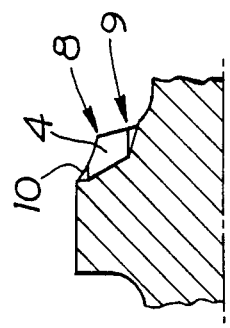
Figure 2:
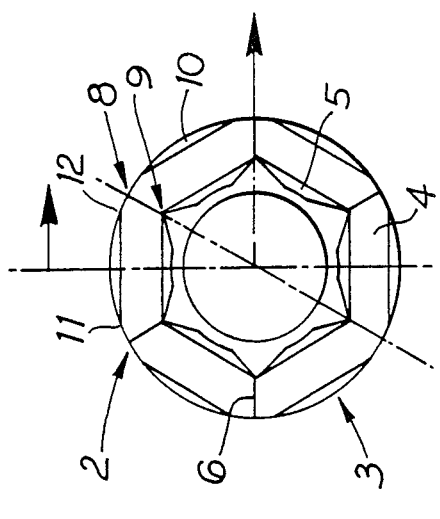
FIG. 2 is a sectional elevation showing one of the lands of the spool of FIG. 1, FIGS. 3 and 4 are detail views of the form of the notches formed in the lands of the spool.
Figure 3:
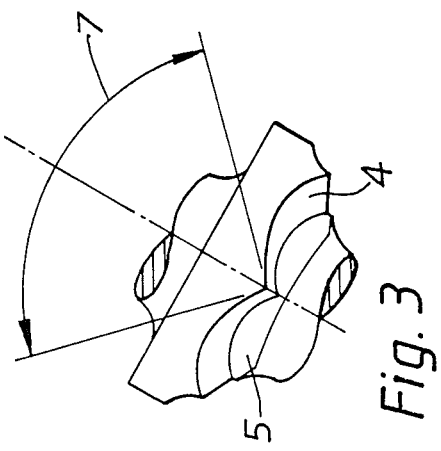

Referring to FIG. 1, the spool 1 has annular lands 2 in known manner. Each of the lands 2 has a plurality of notches 3 which are in a side surface thereof and which extend radially inwards thereof. Each of the notches 3 is of equal size and comprises an outer part conical portion 4 the inclusive conical angle of which is substantially 360/N where N equals the number of notches, and a radially inner part conical portion 5 the inclusive conical angle of which is greater than that of the part conical portion 4. The portions 4 of adjacent notches 3 are separated by an edge 6 which lies in a plane extending longitudinally and radially of the spool, as will best be seen from FIG. 2. The inclusive angle 7 between the notches 3 is such that the edges 6 are well buttressed by the material remaining between the notches. With the inclusive conical angle of the notches being 360°/N, the inclusive angle 7 will remain constant between the points 8 and 9 shown in FIGS. 2 and 4. In addition, each of the notches 3 has a part cylindrical portion 10 at the outer periphery of the land 2. This part cylindrical portion 10 is contained between the points 11 and 12 as shown in FIG. 2 so that it does not interfere with the geometry of the notch configurations at the edges 6. The part cylindrical portion 10 of each notch serves the function of preventing the opening point of the spool being shifted axially when the spool is subjected to diameter finishing operations such as grinding.

Figure 5:
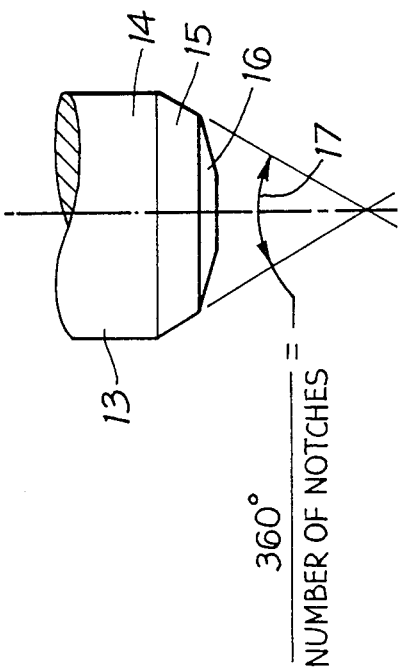
FIG. 5 is a detail of the cutting end portion of a milling cutter for forming the notches.

The notches 3 can be formed in any suitable manner, such as by spark erosion or the like. However, a preferred method of producing the notches 3 is to use a milling cutter 13 as shown in FIG. 5 the cutting end portion of which comprises a cylindrical portion 14 for producing the notch portion 10, a frusto-conical portion 15 for producing the part conical notch portion 4 and a frusto-conical portion 16 for producing the part conical notch portion 5. The inclusive conical angle 17 of the portion 15 is $$\frac{360°}{\text{over the number of notches}}$$

plus or minus 30°. The notches 3 are produced by introducing the milling cutter 13 radially of the spool 1 so that the axis of the part conical portions 4 of the notches 3 extend radially of the spool 1.

Figure 7:
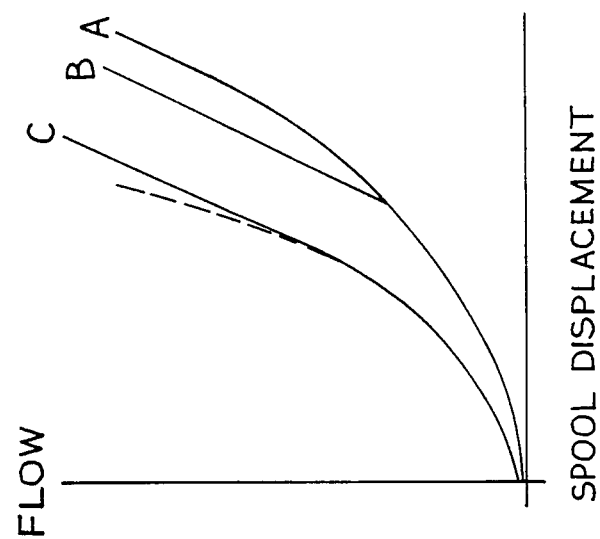
FIG. 7 is a flow diagram illustrating the difference in flow characteristics provided by the known notch configurations and the notch configuration of a spool of the present invention.
Figure 6:
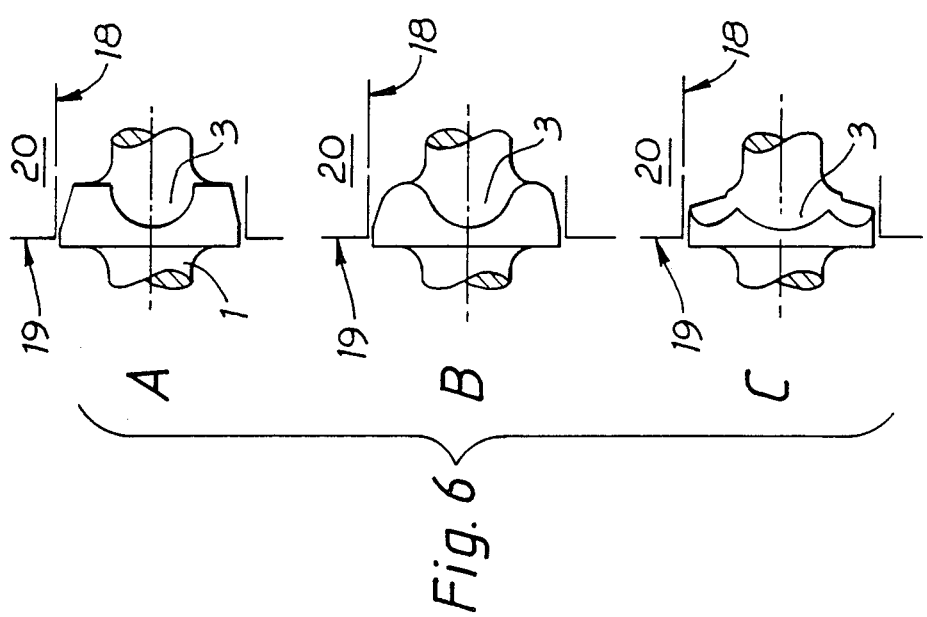
FIGS. 6(A) and 6(B) illustrate known notch configurations whilst
FIG. 6(C) illustrates the notch configuration of a spool according to the invention.
Figure 12:
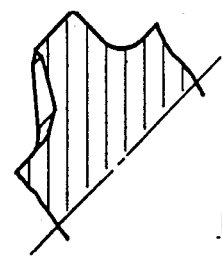
FIG. 12 is a sectional view taken along the line Z—Z in FIG. 8.
Figure 9:
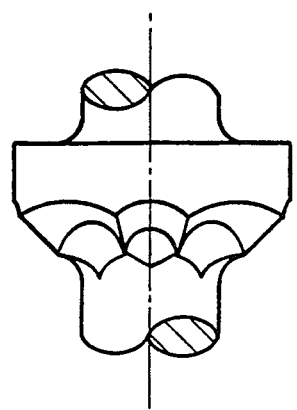
FIG. 9 is a fragmentary side view of the spool shown in FIG. 8.
Figure 11:
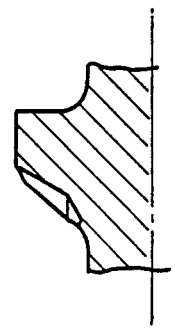
FIG. 11 is a fragmentary sectional view taken along the line Y—Y in FIG. 8.
Figure 8:
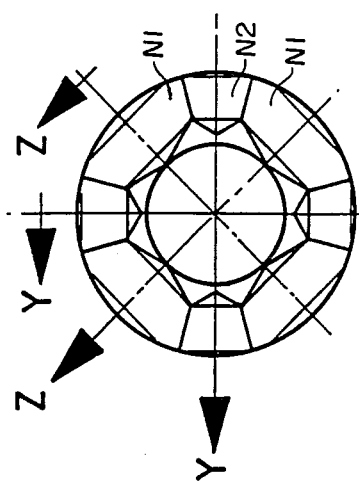
FIG. 8 is a sectional view of a modified form of spool.
Figure 10:
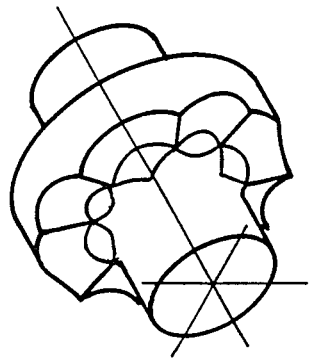
FIG. 10 is a perspective view of the spool shown in FIGS. 8 and 9.

Reference will now be made to FIG. 6 in which like parts have been given like reference numerals and in which in each case the spool 1 is shown cooperating with an annular land 18 within a passage 19 of a valve body 20. Referring first to FIG. 6A it will be seen that the known notch configuration 3 is part-cylindrical as shown. With such a known notch configuration it is not possible to arrange the notches too close together otherwise the material remaining between the notches will be mechanically weak and liable to over hardening during subsequent heat treatment or the like. Thus, due to the necessity to leave sufficient material between adjacent notches it is not possible to maximise the flow rate through a spool valve comprising such a spool. Moreover, spool valves with such a notch configuration suffer from the further disadvantage that, due to the position of the inlet and outlet ports within the valve body, the flow rate through the valve can vary with the angular position of the spool given a constant differential pressure between the inlet and outlet ports of the valve, with this sensitivity to angular position increasing with increasing flow rate. Thus, a notch configuration as shown in FIG. 6A gives a flow rate versus spool displacement curve as shown at A in FIG. 7. The notch configuration of FIG. 6A is sometimes modified as shown in FIG. 6B by blending the notches together. As shown by the curve B in FIG. 7, such a modification of the notch configuration produces an improvement in the flow rate versus spool displacement but suffers from the disadvantage that there is a rapid change in the area available for fluid flow as the notches 3 emerge from within the land 18 as shown by the line B in FIG. 7. Ideally the flow rate versus spool displacement curve should start off as a setep curve and there should then be a smooth transition to a straight line tangent to the original curve. It can readily be seen from the line B in FIG. 7 that this is not achieved by the notch configuration of FIG. 6B. It will also be seen from line C in FIG. 7 that the notch configuration of the present invention as diagrammatically illustrated in FIG. 6C not only maximises fluid flow through a spool valve comprising a spool according to the present invention but that the notch configuration also provides a smooth transition from partial flow through the notches 3 only to full flow around the full circumference of the spool.

Referring to FIGS. 8–12, the spool may be provided with notches of different sizes evenly arranged around the land. As shown, the notches N1 are larger than the notches N2.

Figure 15:
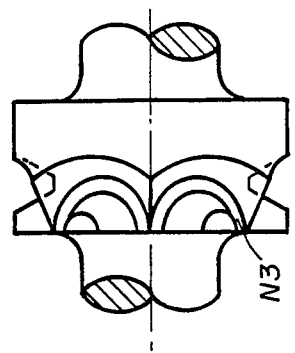
FIG. 15 is a fragmentary side elevational view of the spool shown in FIG. 14.
Figure 13:
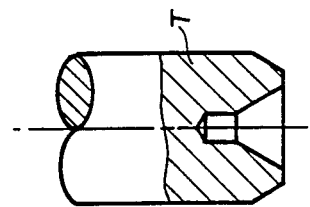
FIG. 13 is a part sectional view of a tool utilized in making a modified spool.
Figure 14:
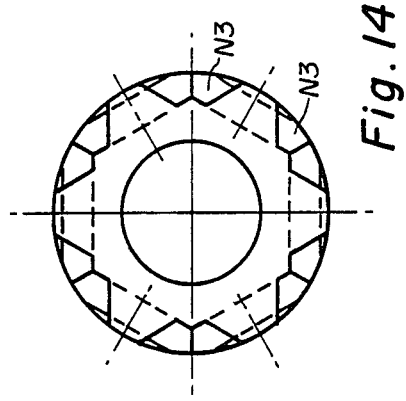
FIG. 14 is an end view of a further modified form of spool.
Figure 16:
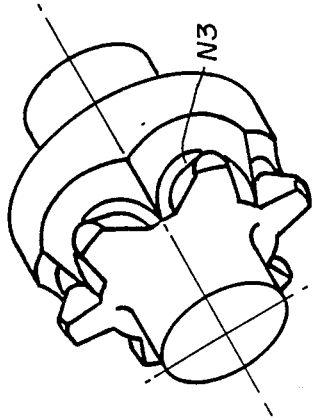
FIG. 16 is a perspective view of the tool shown in FIGS. 14 and 15.

By utilizing the tool T shown in FIG. 13, notches N3 can be made as shown in FIGS. 14–16.

What is claimed is:

1. A cylindrical spool for a spool valve, the spool comprising at least one annular land having at least three intersecting notches in a side surface thereof and extending inwardly from the outer periphery thereof, the form of each notch being non-cylindrical at its intersection with an adjacent notch such that the notch tapers inwardly from the outer periphery of the land, and each notch extends generally radially of the associated land.

2. A spool according to claim 1, wherein said notches are of equal size and are equispaced around said land.

3. A spool according to claim 2, wherein each notch is part-conical and the inclusive conical angle of each of said notches is 360°/N±30° where N equals the number of notches.

4. A spool according to claim 1, wherein said notches are of at least two different sizes.

5. A spool according to claim 4, wherein the angular distance between the axis of any two adjacent notches is substantially equal to half the sum of the inclusive conical angles of the two adjacent notches.

6. A spool according to claim 4, wherein said notches are equispaced around said land.

7. A spool according to claim 1, wherein adjacent notches are separated by an edge which is inclined to a diametrial plane of the spool.

8. A spool according to claim 1, wherein each said notch comprises a part cylindrical portion at the outer periphery of said land, the cylindrical portion terminating short of the intersection with each adjacent notch.

9. A spool according to claim 8, wherein each said notch comprises a first outer conical portion having a first inclusive conical angle and a radially inner conical portion having an inclusive conical angle larger than said first inclusive conical angle.

10. A spool according to claim 1, wherein each said notch is part-conical and each said notch comprises a blend form of blending the part-conical notch with the body of the spool.

11. A spool valve comprising a valve body having a passage therein and a spool according to claim 1 slidable in said passage.

12. A method of producing a spool for a spool valve comprising the steps of obtaining a spool having at least one annular land thereon and forming in a side surface of said land at least three intersecting notches which extends inwardly from the outer periphery thereof, the form of each notch being non-cylindrical at its intersection with an adjacent notch such that the notch tapers inwardly from the outer periphery of the land, and each notch extends generally radially of the associated land.

13. A method according to claim 12, wherein each notch is formed by a milling cutter having a frusto-conical cutting end portion.

14. A method according to claim 12, wherein each notch is formed by a tool which has a recessed cutting end portion.

15. A method according to claim 12, wherein said spool is subjected to a final grind after the forming of said notches.

16. A method according to claim 12, wherein said spool is subjected to a hardening treatment after the forming of said notches.

* * * * *